United States Patent
Missout et al.

(10) Patent No.: US 6,552,667 B1
(45) Date of Patent: Apr. 22, 2003

(54) NON-CONTACT MEASURING METHOD AND APPARATUS FOR PRODUCING A SIGNAL REPRESENTATIVE OF A DISTANCE BETWEEN FACING SURFACES

(75) Inventors: Gilles Missout, Saint-Bruno (CA); François Lalonde, Varennes (CA); Jean-Marc Bourgeois, Longueuil (CA)

(73) Assignee: Hydro-Quebec, Montreal (CA)

( * ) Notice: Subject to any disclaimer, the term of this patent is extended or adjusted under 35 U.S.C. 154(b) by 334 days.

(21) Appl. No.: 09/713,005

(22) Filed: Nov. 16, 2000

(51) Int. Cl.[7] .............................................. G08C 19/10
(52) U.S. Cl. .................. 340/870.37; 324/661; 324/662; 324/690; 324/678
(58) Field of Search ...................... 340/870.37; 324/661, 324/662, 690, 678

(56) References Cited

U.S. PATENT DOCUMENTS

| | | | |
|---|---|---|---|
| 4,675,670 A | | 6/1987 | Lalonde et al. ......... 340/870.37 |
| 5,012,196 A | * | 4/1991 | Baranski ..................... 324/662 |
| 5,070,302 A | * | 12/1991 | Marcus et al. .............. 324/662 |
| 5,990,807 A | * | 11/1999 | Cloutier et al. ........ 340/870.37 |
| 6,075,464 A | * | 6/2000 | Cloutier et al. ........ 340/870.37 |
| 6,114,862 A | * | 9/2000 | Tartagni et al. ............. 324/662 |
| 6,307,385 B1 | * | 10/2001 | Tardif et al. ................ 324/678 |

* cited by examiner

*Primary Examiner*—Michael Horabik
*Assistant Examiner*—Albert K. Wong
(74) *Attorney, Agent, or Firm*—Foley & Lardner (57) ABSTRACT

A non-contact measuring method and apparatus for producing a signal representative of a distance between facing surfaces of first and second parts, which are closely spaced apart such as the rotor and stator of an electric rotating machine. The method resides in positioning a sensor on the surface of the first part. The sensor includes first and second parallel, superimposed conductive plates electrically insulated from one another. The second plate is located in between the first plate and the surface of the first part. The first plate is fed with a high frequency signal through a resistance. A high impedance, low input capacity, unitary gain voltage amplifier is fed with the high frequency signal through the resistance. The second plate is fed with an output signal of the amplifier. The output signal of the amplifier is directly proportional to the distance between the two surfaces.

18 Claims, 8 Drawing Sheets

NON-CONTACT MEASURING METHOD AND APPARATUS FOR PRODUCING A SIGNAL REPRESENTATIVE OF A DISTANCE BETWEEN FACING SURFACES

FIELD OF THE INVENTION

The present invention relates to a non-contact measuring method and apparatus for producing a signal representative of a distance between facing surfaces, particularly the air gap between a rotor and a stator of an electric rotating machine.

BACKGROUND OF THE INVENTION known in the art is U.S. Pat. No. 4,675,670 (LALONDE et al.), which describes an apparatus and method for measuring an air gap of an electric rotating machine. According to LALONDE et al. a sensor is preferably positioned on the stator of the electric rotating machine. A high frequency signal drives the sensor and a current detector measures a current signal that is inversely proportional to the distance between the rotor and the stator. One drawback of this design is the necessity of providing processing means in order to linearize the current signal. As persons skilled in the art will understand, such a linearization process is undesirable because it diminishes the precision of the measurements. Another drawback of this design is that a transformer must be used in the current detector and it consumes a considerable amount of energy. Yet another drawback of the apparatus is that its size is inadequate for permanently installing it on the rotor. Still another drawback of this apparatus is its inability to easily select the operating frequency. Furthermore, such design does not permit measuring discharges in the stator.

Also known in the art is the HydroScan™ from MCM ENTERPRISE LTD. The HydroScan™ uses a series of sensors which are positioned all around an electric rotating machine for measuring both the distance between rotor and stator and for detecting local partial discharges. The design of the HydroScan™ is undesirable, because it requires expensive and complex equipment which provides readings that must be analyzed by specialists for determining locations of the local partial discharges.

SUMMARY OF THE INVENTION

An object of the present invention is to provide a non-contact measuring method and apparatus for producing a signal representative of a distance between facing surfaces of first and second parts, such as the rotor and stator of an electric rotating machine, more precisely, and with a cheaper and less consuming circuit than those of the prior art.

According to the present invention, there is provided a non-contact measuring method for producing a signal representative of a distance between facing surfaces of first and second parts which are closely spaced apart, the second part being grounded, the method comprising the steps of:

(a) positioning a sensor on the surface of the first part, the sensor including first and second parallel, superimposed conductive plates electrically insulated from one another, the plates being parallel to the surface of the first part and electrically insulated therefrom, the second plate being located in between the first plate and the surface of the first part;

(b) feeding the first plate of the sensor with a high frequency signal through a resistance;

(c) feeding an input of a high impedance, low input capacity, unitary gain voltage amplifier with the high frequency signal through the resistance; and (d) feeding the second plate with an output signal of the amplifier, the output signal of the amplifier being representative of the distance between the two surfaces.

Preferably, step (b) is characterized in that the first plate of the sensor is fed through an interior conductor of a coaxial cable; and step (d) is characterized in that the second plate is fed through an external conductor of the coaxial cable.

Preferably, the non-contact measuring method further comprises a step of feeding a demodulator circuit with the output signal of the amplifier, an output signal of the demodulator circuit being a DC voltage signal representative of the distance between the two surfaces.

Preferably, the non-contact measuring method further comprises a step of feeding a synchronous detector with both the high frequency signal and the output signal of the amplifier, an output signal of the synchronous detector being a DC voltage signal representative of the distance between the two surfaces.

Preferably, steps (b) and (c) are characterized in that the resistance is an electrically controlled variable resistance, and the method further comprises the steps of:

feeding an input of a comparator with the output signal of the demodulator circuit;

feeding another input of the comparator with a reference signal;

feeding an up/down input of a counter with an output signal of the comparator;

feeding a clock input of the counter with the high frequency signal; and feeding a digital control input of the electrically controlled variable resistance with a digital output signal of the counter, the digital output signal being representative of the distance between the two surfaces.

Preferably, steps (b) and (c) are characterized in that the high frequency signal is generated by a frequency controlled generator, and the method further comprises the steps of:

feeding an input of a comparator with the output signal of the demodulator circuit;

feeding another input of the comparator with a reference signal;

feeding an input of a frequency controller with an output signal of the comparator; and feeding a digital control input of the frequency controlled generator with a digital output signal of the frequency controller, the digital output signal being representative of the distance between the two surfaces.

Preferably, the first and second parts are respectively rotor and stator of an electric rotating machine, the first plate includes a guarded ring, and the method further comprises the steps of:

feeding an input of a high pass filter with the output signal of the amplifier while the rotor is rotating with respect to the stator; and feeding an input of an amplifier and detector with an output signal of the high pass filter, the amplifier and detector providing a DC voltage signal representative of discharges occurring between internal elements of the stator.

Preferably, the non-contact measuring method further comprises the step of memorizing the DC voltage signal of amplifier and detector as the rotor rotates with respect to the stator to identify amplitudes and locations of the discharges occurring around the stator.

Preferably, the first and second parts are respectively rotor and stator of an electric rotating machine, the first plate includes a guarded ring, and the method further comprises the step of memorizing the output signal of the amplifier while the rotor rotates with respect to the stator to identify amplitudes and locations of air gaps around the stator.

Preferably, the non-contact measuring method is characterized in that:
- the high frequency signal used steps (b) and (c) has a frequency between 100 kHz and 500 kHz; and
- the resistance used in steps (b) and (c) is substantially 500 kOhm.

According to the present invention, there is also provided a non-contact measuring apparatus for producing a signal representative of a distance between facing surfaces of first and second parts which are closely spaced apart, the second part being grounded, comprising:
- a sensor adapted to be mounted on the surface of the first part, the sensor including first and second parallel, superimposed conductive plates electrically insulated from one another, the plates being parallel to the surface of the first part and electrically insulated therefrom, the second plate being located in between the first plate and the surface of the first part;
- a high frequency signal generator having an output for generating a high frequency signal;
- a resistance connected in series with the output of the high frequency signal generator; and
- a high impedance, low input capacity, unitary gain voltage amplifier having an input connected to both the resistance and to the first plate of the sensor, and an output connected to the second plate of the sensor, the output of the amplifier providing an output signal representative of the distance between the two surfaces.

BRIEF DESCRIPTION OF THE DRAWINGS

The invention as well as its numerous advantages will be better understood by the following non restrictive description of preferred embodiments made in reference to the appending drawings in which.

DESCRIPTION OF PREFERRED EMBODIMENTS

Figure 1:
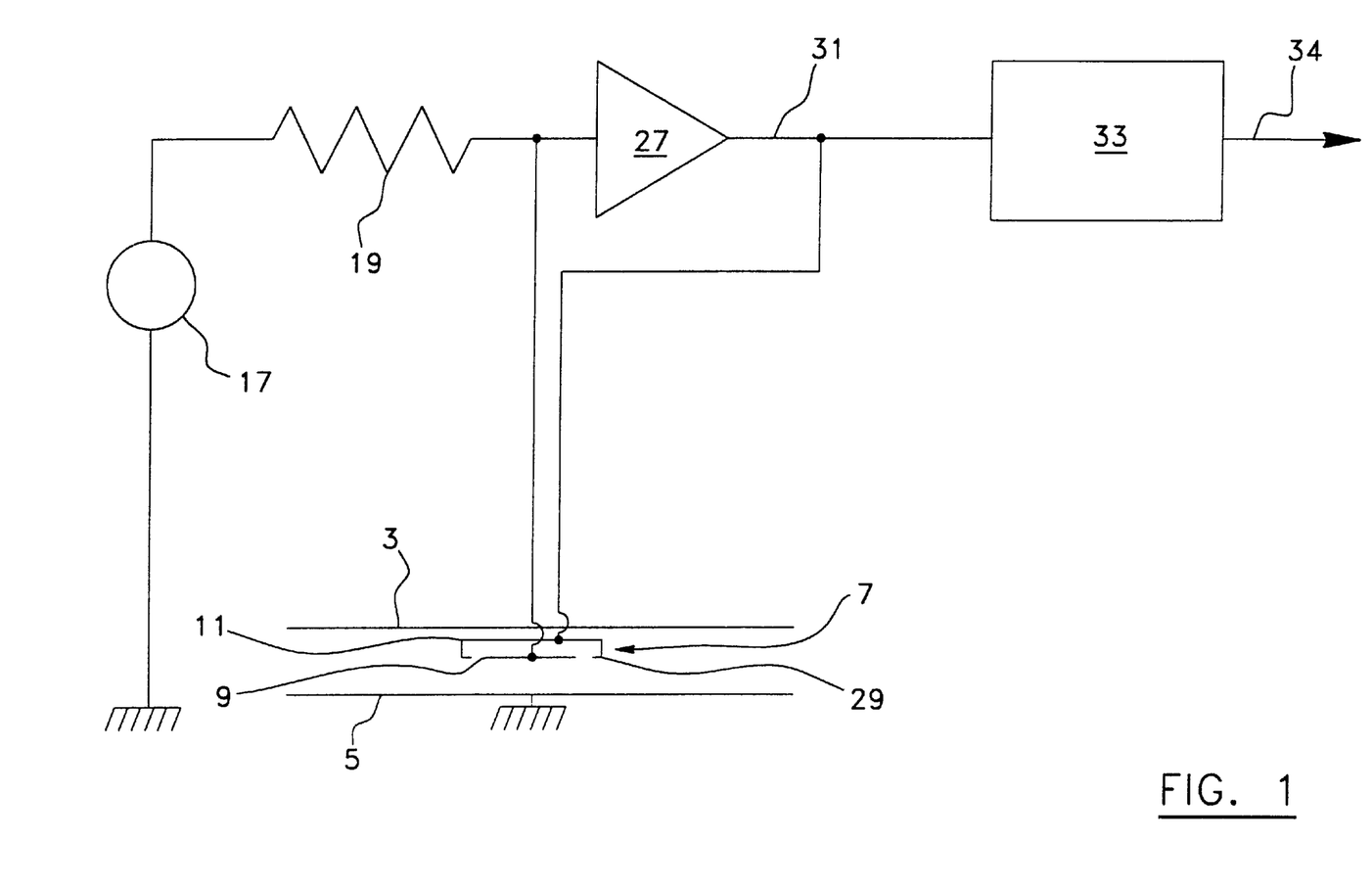
FIG. 1 is a block diagram of a non-contact measuring apparatus, according to the present invention.
Figure 2:
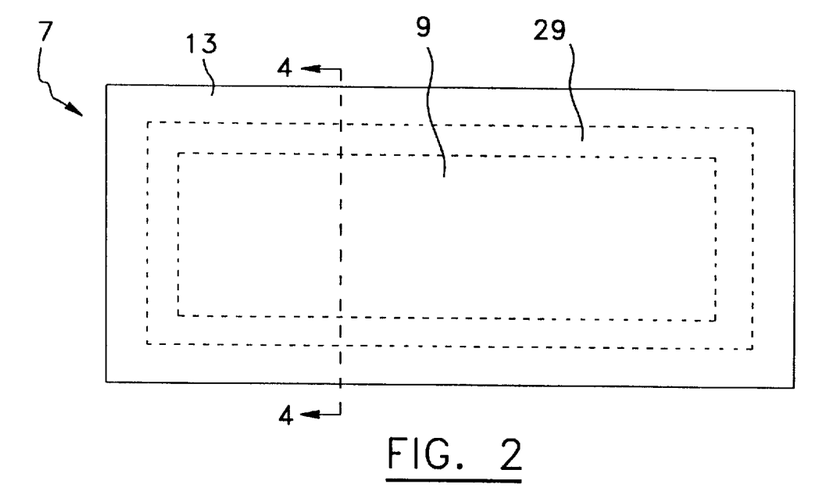
FIG. 2 is a top view of a sensor of the non-contact apparatus shown in FIG. 1.
Figure 3:
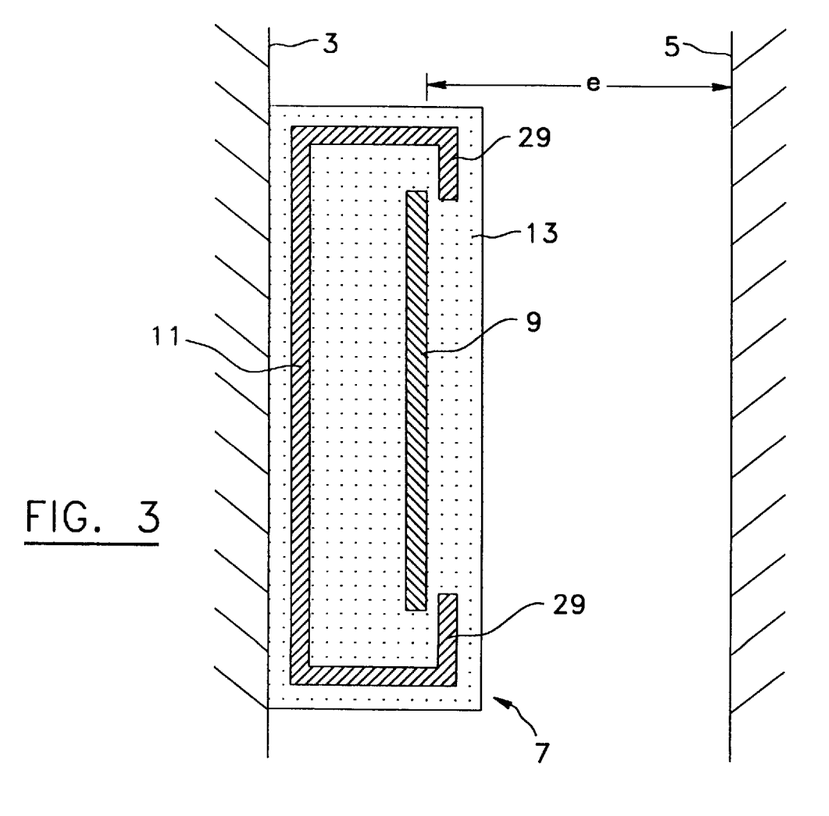
FIG. 3 is a side section view along line 4—4 of the sensor shown in FIG. 2.

Referring to FIGS. 1, 2 and 3, there is a non-contact measuring apparatus according to the invention for producing a signal representative of a distance between facing surfaces of first and second parts 3, 5 which are closely spaced apart. As illustrated, the second part 5 is grounded. The surface of the first part 3 may be, for example, a pole of a rotor of an electric rotating machine, while the surface of the second part 5 may be that of a stator bore. However, it should be understood that the invention need not be limited to measuring a distance between the rotor and stator of a rotating machine. The apparatus may also be used, for example, in linear generators. It can also advantageously replace eddy current sensors currently used in mechanical applications, and in such fields as avionics, or the paper industry where precise non-contact distance measurements are required.

The apparatus comprises a sensor 7 adapted to be mounted on the surface of the first part 3. The sensor 7 includes first and second parallel, superimposed conductive plates 9, 11 electrically insulated from one another. The plates 9, 11 are parallel to the surface of the first part 3 and electrically insulated therefrom. The second plate 11 is located in between the first plate 9 and the surface of the first part 3. The apparatus also comprises a high frequency signal generator 17 having an output for generating a high frequency signal, a resistance 19 connected in series with the output of the high frequency signal generator 17, and a high impedance, low input capacity, unitary gain voltage amplifier 27. This amplifier 27 has an input connected to both the resistance 19 and to the first plate 9 of the sensor 7, and an output 31 connected to the second plate 11 of the sensor 7. The output 31 of the amplifier 27 provides an output signal representative of the distance between the two surfaces 3,5.

By means of the apparatus described above there is produced a signal representative of a distance between the two surfaces, more precisely, and with a cheaper and less consuming circuit than those of the prior art.

The first and second parallel, superimposed conductive plates 9, 11 are electrically insulated from one another by means of an appropriate insulation material 13. The sensor 7 is designed to be positioned on the very surface of the first part 3 so that the two plates 9, 11 be parallel to this surface and electrically insulated therefrom. This insulation may be carried out by the insulation material 13 already used for electrically insulating the plates 9, 11.

It is proper to note that the sensor 7 may indifferently be positioned on the rotor or the stator only when the distance separating each other is to be determined. However, as it will be explained further below, when both the distance and electric discharges in the stator are to be measured, the sensor 7 is positioned on the rotor.

The positioning of the sensor on the very surface of the first part 3 may be achieved by simply gluing it or by any other appropriate means. When it is intended to mount the sensor 7 on an electric generator to measure the air gap of the latter, it is advantageous to groove the surface of the conductive plates 9, 11 by means of grooves in order to reduce eddy currents as much as possible.

In order to reduce as much as possible parasitic voltages, one may vary the size of the surface of the plates 9, 11 by increasing one with respect to the other, or vary the distance that separates them, being understood that the smaller this distance, the smaller the parasitic voltages will be.

Referring back to FIG. 1, a demodulator circuit 33 can be further provided to process the output signal of the amplifier 27. The demodulator circuit 33 has an input connected to the output 31 of the amplifier 27, while an output 34 of the demodulator circuit 33 provides a DC voltage signal which is representative of the distance between the two surfaces 3, 5.

Preferably, means, such as a computer, can be provided for memorizing the output signal of the amplifier 27 while the rotor rotates with respect to the stator to identify amplitudes and locations of air gaps around the stator.

Preferably, to further reduce parasitic voltages, a guarded ring 29 is included in the sensor 7. The guarded ring 29 is connected to the second plate 11 and extends all around and partly over the first plate 9, as best shown in FIGS. 2 and 3.

The high frequency signal generator 17 has an output for generating a high frequency signal. For instance, the frequency signal may be a sinusoidal wave or even a square wave. As an example, the voltage signal of the signal generator 17 is given by the following equation:

$$E = V_o \cos(2\pi Ft) \qquad (1)$$

Where $V_o$ is the amplitude of the voltage signal, F is the frequency of operation, and t is the time.

In theory, the sensor 7 acts as a capacitance in a low pass RC filter circuit configuration where R is the resistance 19. The value of the sensor capacitance is given by the following equation:

$$C = \epsilon_o S/e \qquad (2)$$

Where $\epsilon_o$ is the dielectric constant of air, S is the surface of the first plate 9 of the sensor 7, and e is the distance separating the first plate 9 from the second part 5, which is inversely proportional to the sensor capacity.

Furthermore, the output signal of the amplifier 27 theoretically corresponds to the voltage of the sensor capacitance, which is given by the following equation:

$$V_s = V_o/(1 + jRC2\pi F) \qquad (3)$$

Therefore, if $RC2\pi F$ is much larger than 1, then the voltage of the sensor capacitance is given by the following equation:

$$V_s \approx V_o/jRC2\pi F \qquad (4)$$

And by replacing C from equation (1), it becomes:

$$V_s \approx V_o e/jR\epsilon_o S2\pi F \qquad (5)$$

Therefore, the output signal of the amplifier 27 is theoretically directly proportional to the linear distance separating the surface of the first plate 9 of the sensor 7 from the surface of the second part 5 if $RC2\pi F$ is chosen large enough.

In practice, the high frequency signal of the signal generator 17 can have a frequency range comprised between 100 kHz and 500 kHz, while the resistance 19 can take a value of about 500 kOhm. If the frequency signal is below this range, the dynamic of the output voltage signal may become too small to be easily measurable and it then becomes impossible, because of the reduced frequency bandwidth, to determine the distance e. Besides, in the particular case of generators, too low a frequency may cause noises. If, on the other hand, the frequency is too high and is beyond the aforementioned range, there may arise a measuring problem, the amplifiers that make it possible to treat signals at high frequency becoming more and more complicated. Furthermore, too high a frequency may create ground impedance problems. However, according to the present invention, it is possible for the operator to select the operating frequency within the given range of 100 kHz and 500 kHz.

According to the present invention, there is also provided a non-contact measuring method for producing the signal representative of the distance between the facing surfaces. The method comprises the steps of (a) positioning the sensor 7 on the surface of the first part 3, (b) feeding the first plate 9 of the sensor 7 with a high frequency signal through the resistance 19,(c) feeding an input of the high impedance, low input capacity, unitary gain voltage amplifier 27 with the high frequency signal through the resistance, and (d) feeding the second plate 11 with the output signal of the amplifier 27. The output signal of the amplifier 27 is representative of the distance between the two surfaces.

Figure 4:
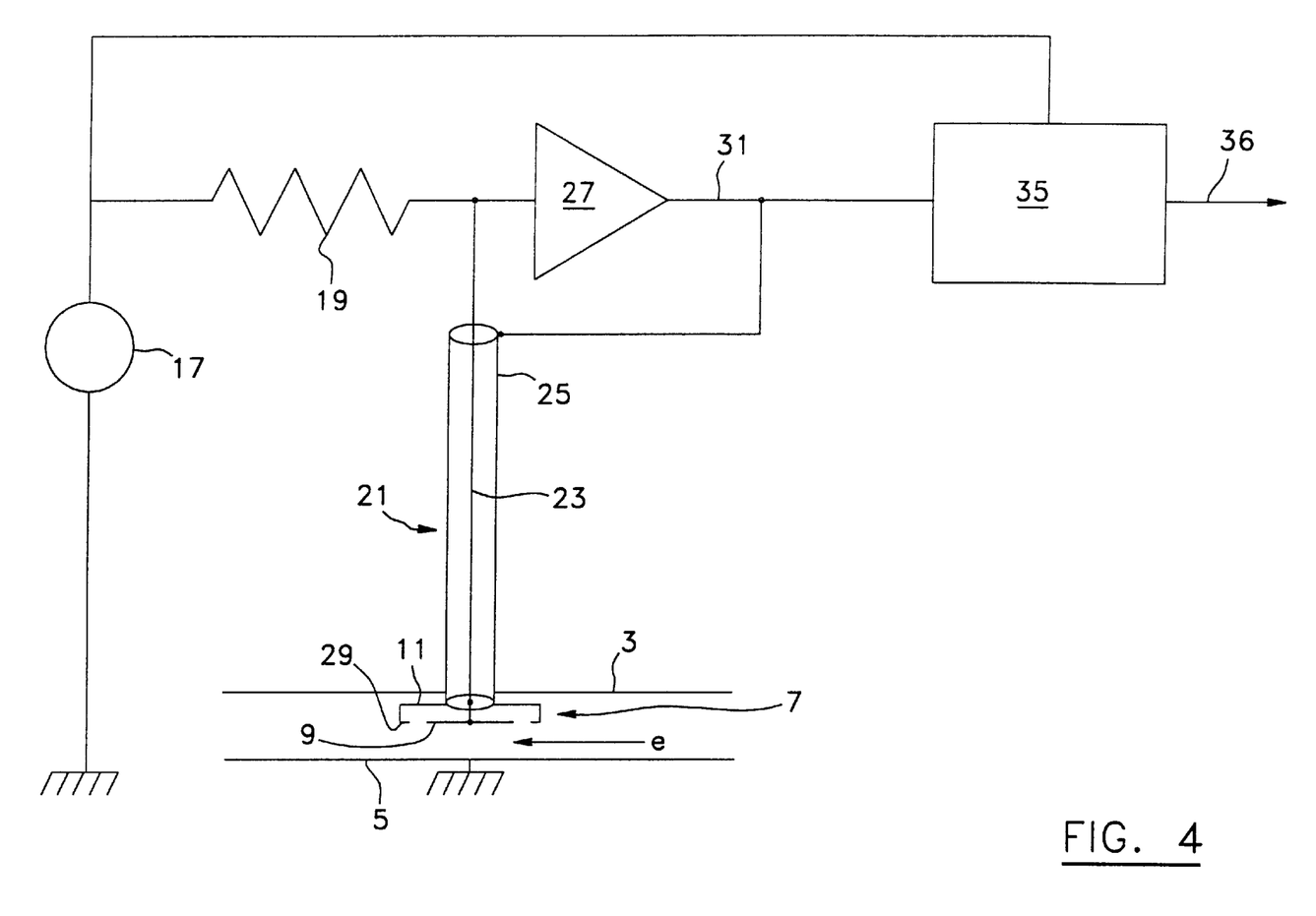
FIG. 4 is a block diagram of a non-contact measuring apparatus, according to another embodiment of the present invention.

Referring to FIG. 4, preferably, to further reduce parasitic voltages, a coaxial cable 21 is used in the apparatus. In such a case, the input of the amplifier 27 is connected to the first plate 9 of the sensor through an interior conductor 23 of the coaxial cable 21, whereas the output 31 of the amplifier 27 is connected to the second plate 11 through an external conductor 25 of the coaxial cable 21. Preferably, a synchronous detector 35 is used as a demodulator circuit. The synchronous detector 35 has a pair of inputs respectively connected to the output of the high frequency signal generator 17 and to the output of the amplifier 27. In operation, an output 36 of the synchronous detector 35 provides a DC voltage signal representative of the distance between the two surfaces 3, 5.

It is important to note that the demodulator circuit need not be a synchronous detector 35. Indeed, a diode and filter circuit or a fast analog to digital converter controlled by a microprocessor may work as well.

Figure 5:
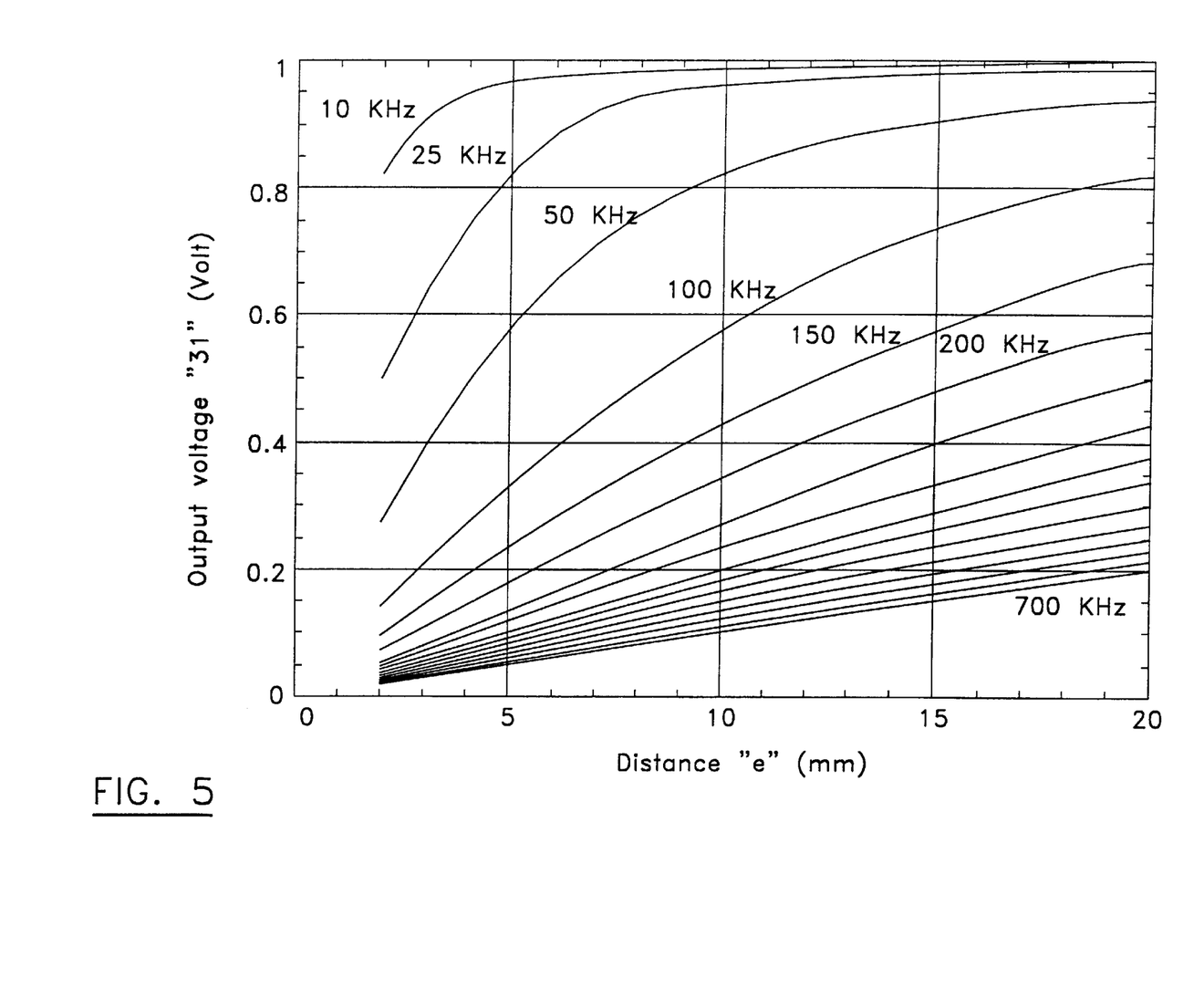
FIG. 5 is a diagram illustrating an absolute voltage output of the amplifier shown in FIG. 4 with respect to e for different values of frequency.
Figure 6:
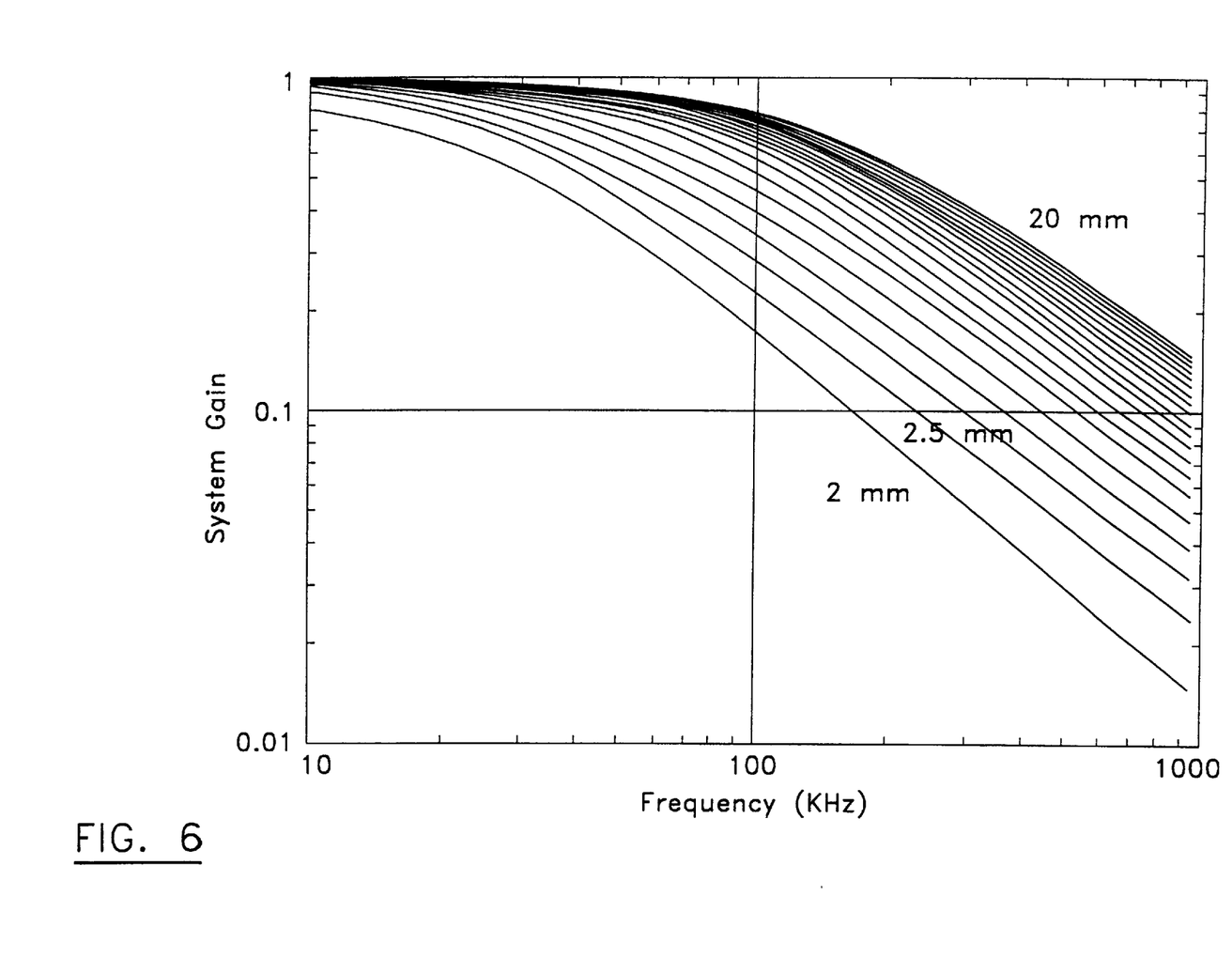
FIG. 6 is a diagram illustrating the system gain with respect to a frequency of operation for different values of e.

Referring to FIG. 5, voltage output curves are shown with respect to the distance e separating the rotor and the stator for different values of frequency. Referring to FIG. 6, system gain curves are shown with respect to the frequency of operation for different values of e. Therefore, for a particular design, it is then possible to determine the curve of linearization of the sensor to accurately determine the value of the distance to be measured as a function of the value of the output voltage signal.

Figure 7:
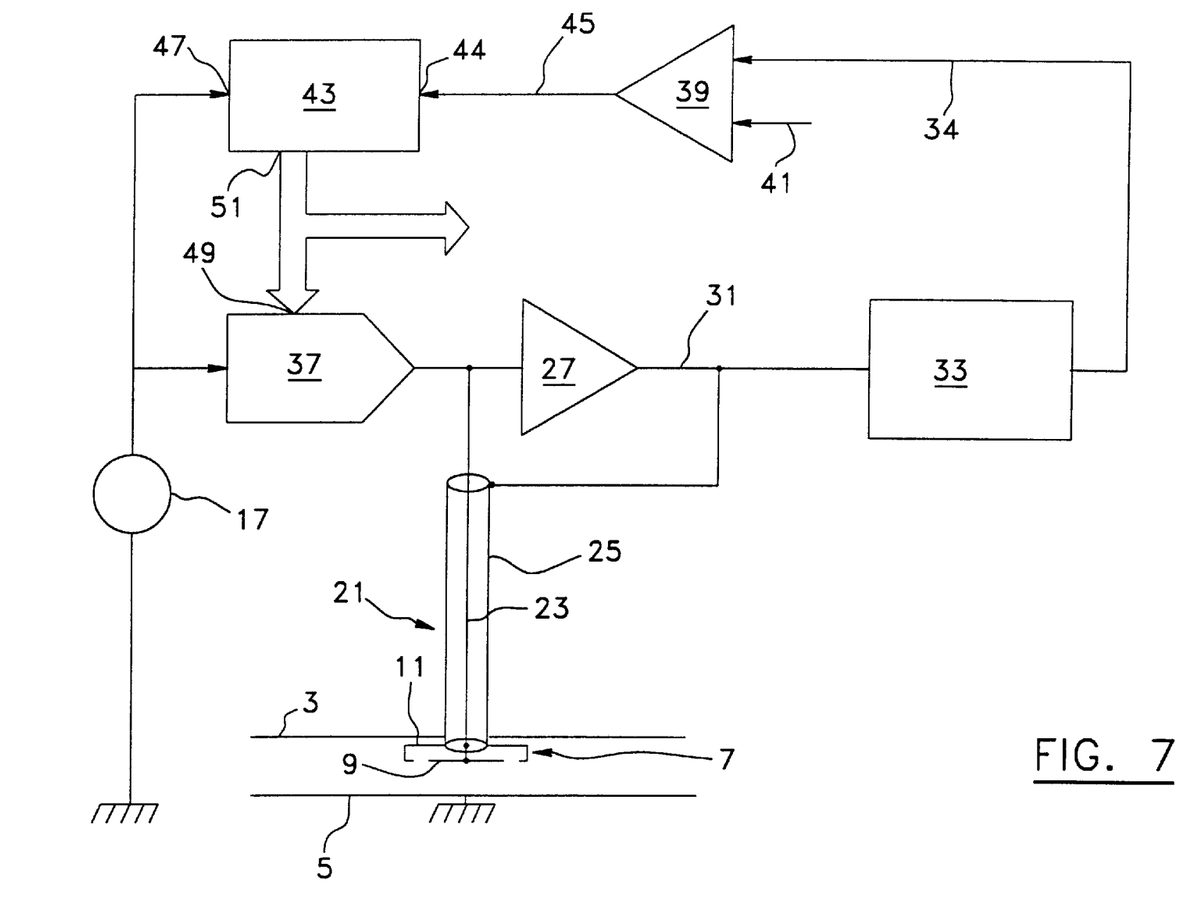
FIG. 7 is a block diagram of a non-contact measuring apparatus, according to another embodiment of the present invention.

Referring to FIG. 7, there is shown a block diagram of a non-contact measuring apparatus according to another embodiment of the invention. According to this embodiment an electronically controlled variable resistance 37 is used instead of resistance 19 shown in FIG. 1. The apparatus, further comprises a comparator 39 which has a first input connected to the output 34 of the demodulator circuit 33. The comparator 39 also has a second input 41 receiving a reference signal level. The apparatus also includes a counter 43 having an up/down input 44 connected to an output 45 of the comparator 39. The counter 43 also has a clock input 47 connected to the output of the high frequency signal generator 17.

The electrically controlled variable resistance 37 has a digital control input 49 connected to a digital output 51 of the counter 43. In operation, the digital output 51 provides an output signal which is representative of the distance between the two surfaces 3, 5.

Figure 8:
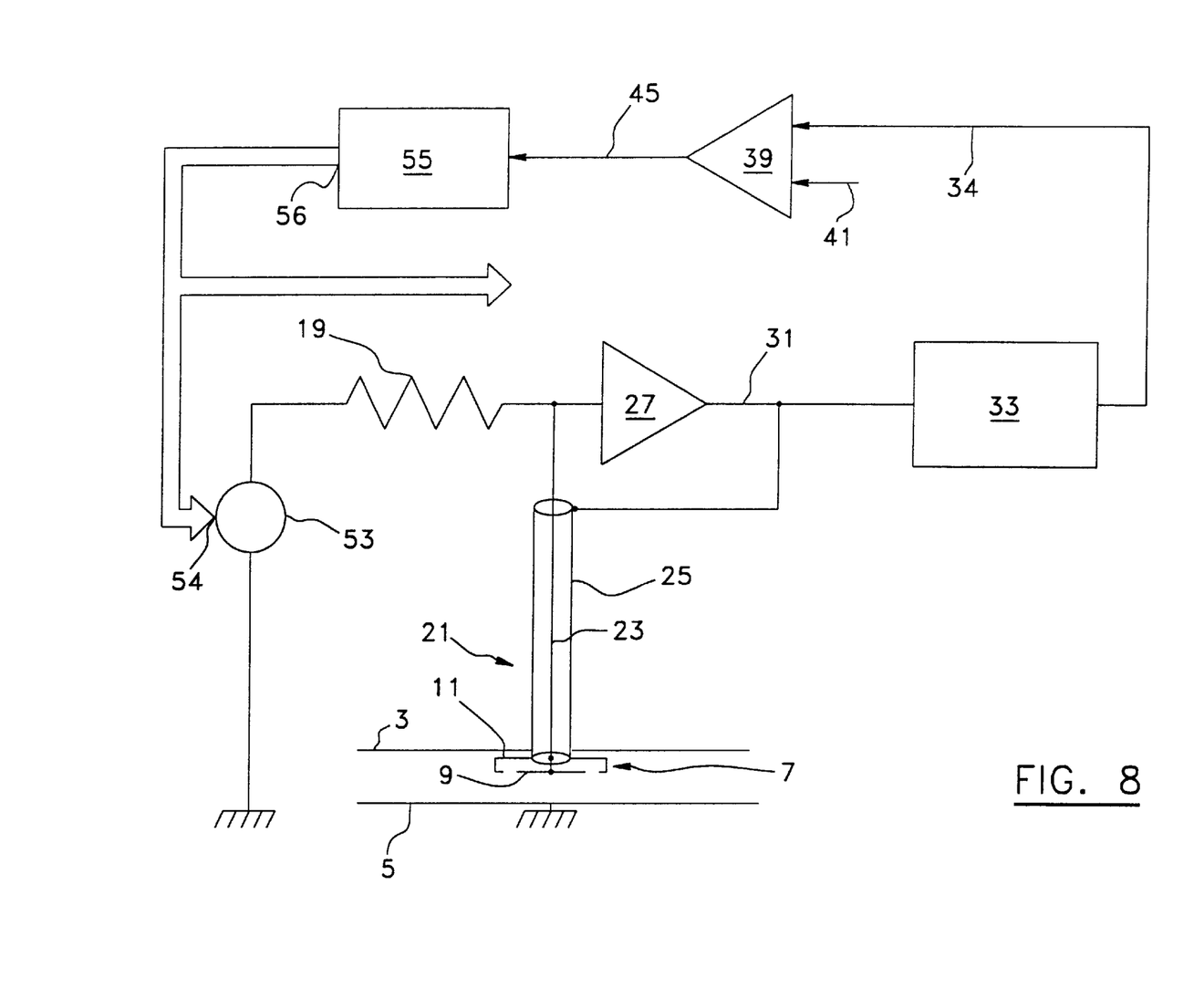
FIG. 8 is a block diagram of a non-contact measuring apparatus, according to another embodiment of the present invention.

Referring to FIG. 8, there is shown a block diagram of a non-contact measuring apparatus according to still another embodiment of the invention. According to this embodiment, the high frequency signal generator 17 shown in FIG. 1 is replaced by a frequency controlled generator 53.

This apparatus comprises a comparator 39 having a first input connected to the output 34 of the demodulator circuit 33, and a second input 41 receiving a reference signal level.

The apparatus also comprises a frequency controller 55 having an input connected to an output 45 of the comparator 39. The frequency controlled generator 53 has a digital control input 54 connected to a digital output 56 of the frequency controller 55. In operation, the digital output 56 of the frequency controller 55 provides an output signal representative of the distance between the two surfaces 3, 5.

Figure 9:
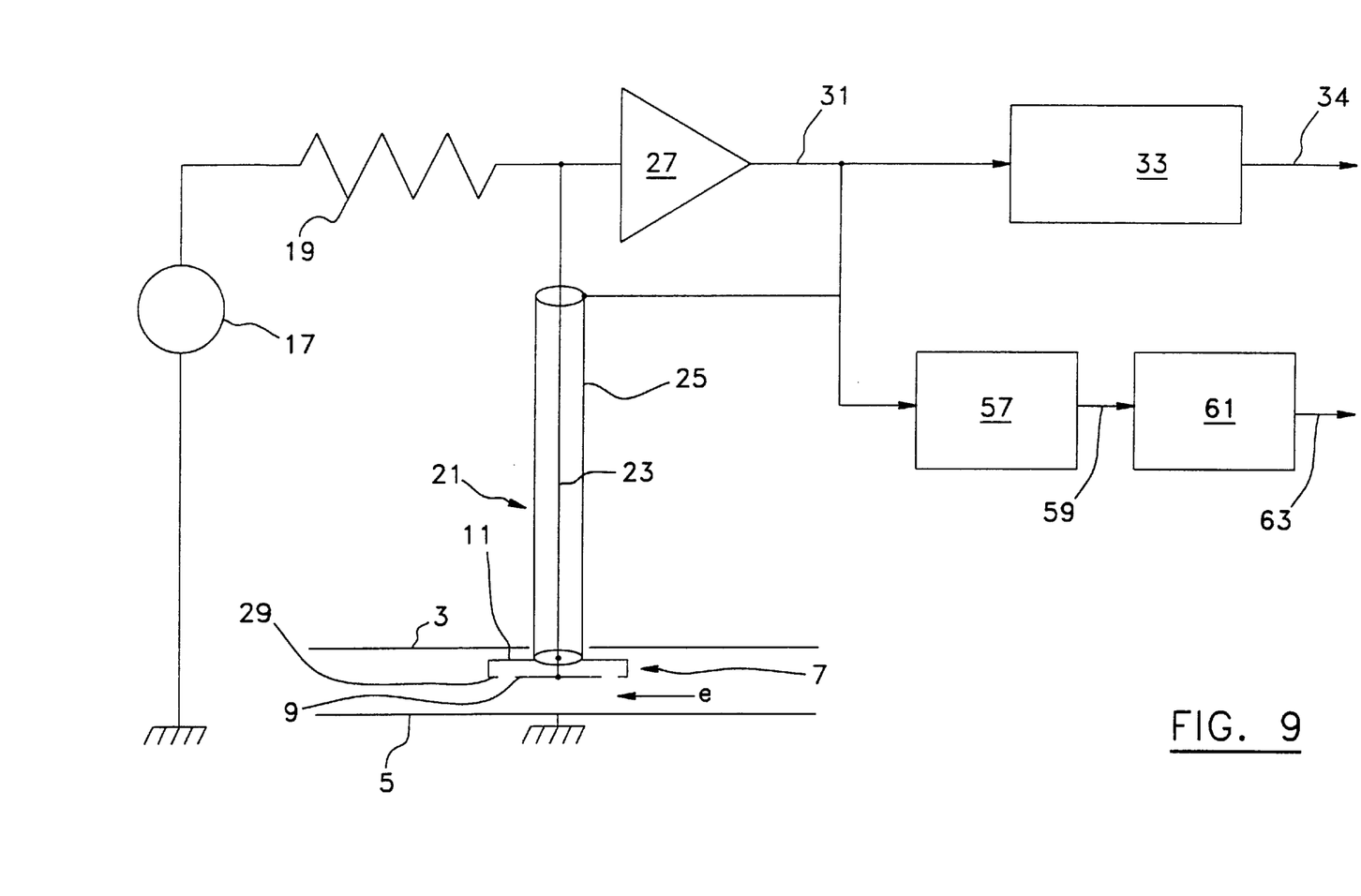
FIG. 9 is block diagram of a non-contact measuring apparatus for measuring discharges, according to another embodiment of the present invention.

Referring to FIG. 9, there is shown a block diagram of a non-contact measuring apparatus according to still another embodiment of the invention. This particular embodiment allows both measuring the distance and determining discharges in the stator.

As mentioned above, in the present case the sensor 7 is positioned on the rotor. Accordingly, in this apparatus the first and second parts are respectively the rotor and stator of an electric rotating machine and the first plate includes a guarded ring 29. This apparatus also comprises a high pass filter 57 having an input connected to the output 31 of the amplifier 27 while the rotor is rotating with respect to the stator. This apparatus also comprises an amplifier and detector 61 having an input connected to an output 59 of the high pass filter 57. In operation, the amplifier and detector 61 provides a DC voltage signal representative of discharges occurring between internal elements of the stator.

In particular, the sensor 7 measures radio frequency signal which are associated with partial discharges in the stator. The nature of these discharges may be diverse and can originate from the stator bars, the stator recesses and stator windings. These partial discharges have a very high frequency spectrum which is much higher than the operating frequency F of the signal generator 17.

The purpose of the high pass filter 57 is thus to eliminate the frequencies associated with the frequency generator 17, while the amplifier and detector 61 provides the amplitude of these radio frequency signals. The operating frequency of the high pass filter can vary between 10 MHz to 250 MHz.

Preferably, this embodiment can be further provided with means, such as a computer, for memorizing the DC voltage signal of amplifier and detector 61 as the rotor rotates with respect to the stator to identify amplitudes and locations of the discharges occurring around the stator.

This last embodiment is advantageous because, for a minimal additional cost, the apparatus can be modified to further measure discharges all around of the stator.

Only one sensor 7 needs to be installed in the rotor, while in operation, it systematically scans the entire stator bore, including all the stator bars, thereby providing more precise location information of discharges than previous systems.

The present apparatus is less expensive to manufacture than prior art apparatus. It consumes less power and less cables are needed, while it provides a detailed cartography of the state of the stator in real time. Future designs may integrate the electronics directly on the sensor 7.

Although preferred embodiments of the present invention have been described in detail herein and illustrated in the accompanying drawings, it is to be understood that the invention is not limited to these precise embodiments and that various changes and modifications may be effected therein without departing from the scope or spirit of the present invention.

What is claimed is:

1. A non-contact measuring method for producing a signal representative of a distance between facing surfaces of first and second parts which are closely spaced apart, the second part being grounded, the method comprising the steps of:

(a) positioning a sensor on the surface of the first part, the sensor including first and second parallel, superimposed conductive plates electrically insulated from one another, the plates being parallel to the surface of the first part and electrically insulated therefrom, the second plate being located in between the first plate and the surface of the first part;

(b) feeding the first plate of the sensor with a high frequency signal through a resistance;

(c) feeding an input of a high impedance, low input capacity, unitary gain voltage amplifier with the high frequency signal through the resistance; and (d) feeding the second plate with an output signal of the amplifier, the output signal of the amplifier being representative of the distance between the two surfaces.

2. Non-contact measuring method according to claim 1, wherein:

step (b) is characterized in that the first plate of the sensor is fed through an interior conductor of a coaxial cable; and step (d) is characterized in that the second plate is fed through an external conductor of the coaxial cable.

3. Non-contact measuring method according to claim 1, further comprising a step of feeding a demodulator circuit with the output signal of the amplifier, an output signal of the demodulator circuit being a DC voltage signal representative of the distance between the two surfaces.

4. Non-contact measuring method according to claim 1, further comprising a step of feeding a synchronous detector with both the high frequency signal and the output signal of the amplifier, an output signal of the synchronous detector being a DC voltage signal representative of the distance between the two surfaces.

5. Non-contact measuring method according to claim 3, wherein steps (b) and (c) are characterized in that the resistance is an electrically controlled variable resistance, the method further comprising the steps of:

feeding an input of a comparator with the output signal of the demodulator circuit;

feeding another input of the comparator with a reference signal;

feeding an up/down input of a counter with an output signal of the comparator;

feeding a clock input of the counter with the high frequency signal; and feeding a digital control input of the electrically controlled variable resistance with a digital output signal of the counter, the digital output signal being representative of the distance between the two surfaces.

6. Non-contact measuring method according to claim 3, wherein steps (b) and (c) are characterized in that the high frequency signal is generated by a frequency controlled generator, the method further comprising the steps of:

feeding an input of a comparator with the output signal of the demodulator circuit;

feeding another input of the comparator with a reference signal;

feeding an input of a frequency controller with an output signal of the comparator; and feeding a digital control input of the frequency controlled generator with a digital output signal of the frequency controller, the digital output signal being representative of the distance between the two surfaces.

7. Non-contact measuring method according to claim 1, wherein the first and second parts are respectively rotor and stator of an electric rotating machine, the first plate includes a guarded ring, the method further comprising the steps of:

feeding an input of a high pass filter with the output signal of the amplifier while the rotor is rotating with respect to the stator; and feeding an input of an amplifier and detector with an output signal of the high pass filter, the amplifier and detector providing a DC voltage signal representative of discharges occurring between internal elements of the stator.

8. Non-contact measuring method according to claim 7, further comprising the step of memorizing the DC voltage signal of amplifier and detector as the rotor rotates with respect to the stator to identify amplitudes and locations of the discharges occurring around the stator.

9. Non-contact measuring method according to claim 1, wherein the first and second parts are respectively rotor and stator of an electric rotating machine, the first plate includes a guarded ring, the method further comprising the step of memorizing the output signal of the amplifier while the rotor rotates with respect to the stator to identify amplitudes and locations of air gaps around the stator.

10. Non-contact measuring method according to claim 9, characterized in that:

the high frequency signal used steps (b) and (c) has a frequency between 100 kHz and 500 kHz; and the resistance used in steps (b) and (c) is substantially 500 kOhm.

11. A non-contact measuring apparatus for producing a signal representative of a distance between facing surfaces of first and second parts which are closely spaced apart, the second part being grounded, comprising:

a sensor adapted to be mounted on the surface of the first part, the sensor including first and second parallel, superimposed conductive plates electrically insulated from one another, the plates being parallel to the surface of the first part and electrically insulated therefrom, the second plate being located in between the first plate and the surface of the first part;

a high frequency signal generator having an output for generating a high frequency signal;

a resistance connected in series with the output of the high frequency signal generator; and a high impedance, low input capacity, unitary gain voltage amplifier having an input connected to both the resistance and to the first plate of the sensor, and an output connected to the second plate of the sensor, the output of the amplifier providing an output signal representative of the distance between the two surfaces.

12. Non-contact measuring apparatus according to claim 11, characterized in that it further comprises a coaxial cable, the input of the amplifier being connected to the first plate of the sensor through an interior conductor of the coaxial cable, the output of the amplifier being connected to the second plate through an external conductor of the coaxial cable.

13. Non-contact measuring apparatus according to claim 11, further comprising a demodulator circuit having an input connected to the output of the amplifier, an output of the demodulator circuit providing a DC voltage signal representative of the distance between the two surfaces.

14. Non-contact measuring apparatus according to claim 11, further comprising a synchronous detector having a pair of inputs respectively connected to the output of the high frequency signal generator and to the output of the amplifier, an output of the synchronous detector providing a DC voltage signal representative of the distance between the two surfaces.

15. Non-contact measuring apparatus according to claim 13, wherein the resistance is an electrically controlled variable resistance, the apparatus further comprising:

a comparator having a first input connected to the output of the demodulator circuit, and a second input connected to a reference signal generator; and a counter having an up/down input connected to an output of the comparator, the counter having a clock input connected to the output of the high frequency signal generator, the electrically controlled variable resistance having a digital control input connected to a digital output of the counter, the digital output providing an output signal representative of the distance between the two surfaces.

16. Non-contact measuring apparatus according to claim 13, wherein the high frequency signal generator is a frequency controlled generator, the apparatus further comprising:

a comparator having a first input connected to the output of the demodulator circuit, and a second input connected to a reference signal generator; and a frequency controller having an input connected to an output of the comparator, the frequency controlled generator having a digital control input connected to a digital output of the frequency controller, the digital output of the frequency controller providing an output signal representative of the distance between the two surfaces.

17. Non-contact measuring apparatus according to claim 11, wherein the first and second parts are respectively rotor and stator of an electric rotating machine, the first plate includes a guarded ring, the apparatus further comprising:

a high pass filter having an input connected to the output of the amplifier while the rotor is rotating with respect to the stator; and an amplifier and detector having an input connected to an output of the high pass filter, the amplifier and detector providing a DC voltage signal representative of discharges occurring between internal elements of the stator.

18. Non-contact measuring apparatus according to claim 17, wherein:

the high frequency signal has a frequency between 100 kHz and 500 kHz; and the resistance is about 500 kOhm.

* * * * *